United States Patent [19]

Watanabe et al.

[11] Patent Number: 4,864,417
[45] Date of Patent: Sep. 5, 1989

[54] IMAGE PROCESSING SYSTEM WITH SPECIFIC READ/PRINT CONTROL

[75] Inventors: Yutaka Watanabe; Masaaki Ito; Hideaki Kusano, all of Osaka, Japan

[73] Assignee: Minolta Camera Kabushiki Kaisha, Osaka, Japan

[21] Appl. No.: 256,759

[22] Filed: Oct. 12, 1988

[30] Foreign Application Priority Data

Oct. 13, 1987 [JP] Japan ................. 62-257891

[51] Int. Cl.$^4$ ............................. H04N 1/23
[52] U.S. Cl. ..................... 358/296; 358/300; 358/302
[58] Field of Search ........... 358/296, 300, 302, 256, 358/285; 346/154; 355/14 R

[56] References Cited

U.S. PATENT DOCUMENTS 4,110,794 8/1978 Lester et al.
4,182,568 1/1980 Levine
4,562,485 12/1985 Maeshima ..................... 358/296
4,786,974 11/1988 Ina ..................... 358/296

Primary Examiner—E. A. Goldberg
Assistant Examiner—Scott A. Rogers
Attorney, Agent, or Firm—Burns, Doane, Swecker & Mathis

[57] ABSTRACT

This invention concerns an image processing system which is constructed by combining a plurality of image readers each adapted to read an image electrically and produce image data as output and a printing means for producing the image on a recording medium based on the introduced image data. During the course of transfer of an image signal from the image readers to the printing means, the image processing system automatically delays the actuation of the image readers when the mode of prohibiting the transfer of image signal exists, whereas the image processing system automatically actuates the image readers immediately after the mode of prohibiting the transfer of image signal changes to the mode of permitting the transfer.

5 Claims, 14 Drawing Sheets

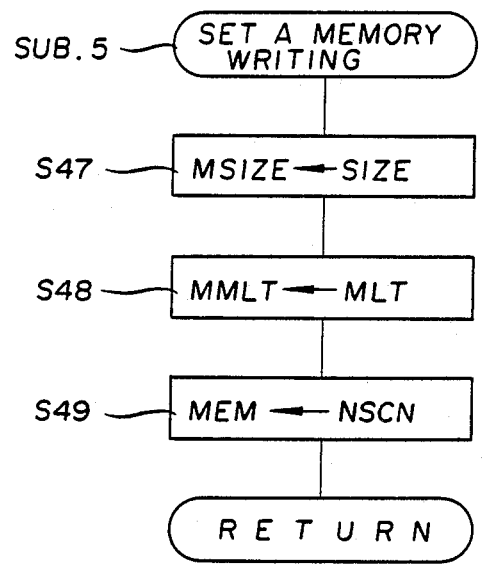

IMAGE PROCESSING SYSTEM WITH SPECIFIC READ/PRINT CONTROL

BACKGROUND OF THE INVENTION

1. Field of the Invention

This invention relates to an image processing system constructed by combining a plurality of image readers such as, for example, microfilm readers and a printing means such as, for example, a laser beam printer. More particularly this invention relates to an image processing system so constructed as to improve the efficiency of the operator's work while the mode of prohibiting the transfer of an image singal is present.

2. Description of the prior arts

In consequence of the recent remarkable advances in the field of image processing technique, for example, the Charge Coupled Device for transforming a discerned image into an electric signal, i.e. the image scanner making use of the so-called CCD, for example, has been enjoying a notable improvement in performance. One typical use to be found for the image scanner is in a microfilm reader which serves the purpose of reading images recorded on a microfilm.

The microfilm reader was primarily intended as a means for causing image data recorded on a microfilm to be projected on a screen in order for the operator thereof to acquire visual knowledge of the image data. From long ago, the desirability of allowing the image data to be preserved also on recording papers as occasion demands has found approval. In the specification of Japanese Patent Application disclosure No. SHO 62(1987)-5,764, an invention aimed at meeting this demand is disclosed which relates to a copying system constructed by combining one microfilm reader and one printing means for producing images read out by the microfilm reader on recording papers or effecting transfer of image data from the microfilm to the recording papers. By this copying system, the image data read out by the image reader such as, for example, the microfilm reader can be recorded for preservation on recording papers through the medium of the printing means.

When the copying system is constructed by combining one image reader and one printing means as has been heretofore practised, adoption of a plurality of image readers inevitably necessitates installation of as many printing means. Incidentally, a printing means generally takes up a wide floor area and costs very dearly. From the standpoint of the economy of both floor space and expense, the adoption of a plurality of printing means has posed a serious problem.

SUMMARY OF THE INVENTION

The inventors, therefore, have taken notice of the problem and the fact that even when a plurality of image readers are installed, all these image readers are not always kept in operation and have consequently invented an image processing system constructed by combining a plurality of image readers and a smaller number of printing means.

This invention is indeed advantageous in terms of the economy of floor space and the cost. It is nevertheless destined to necessitate connection of a plurality of image readers to one printing means. When need arises for the plurality of image readers severally to read images from a microfilm and produce corresponding image signals all at once, therefore, the need is not fully met. The operator, accordingly, is required to keep watch on the operating condition of the printing means and, on detecting a change in the status of the printing means to the mode of permitting transfer of images, immediately set the image readers to the mode for starting the reading of images. This operation turns out to be a very complicated work on the part of the operator and seriously impairs the efficiency of the operator's work.

In an image processing system constructed by connecting printing means to a plurality of image readers, this invention has as a main object thereof the provision of an image processing system which is so constructed that, during the course of transfer of an image signal produced by the image reader to the printing means, the image processing system automatically delays the actuation of the image reader when the mode of prohibiting the transfer of image signal exists, whereas the image processing system automatically actuates the image reader immediately after the mode of prohibiting the transfer of image signal is changed to the mode of permitting the transfer.

Now, a typical image processing system as one embodiment of this invention will be described below as applied to an operation using microfilm readers (hereinafter referred to simply as "scanners") as image readers and a laser beam printer (hereinafter referred to simply as "LBP") as a printing means, with reference to the accompanying drawings.

DETAILED DESCRIPTION OF THE INVENTION

Figure 2:
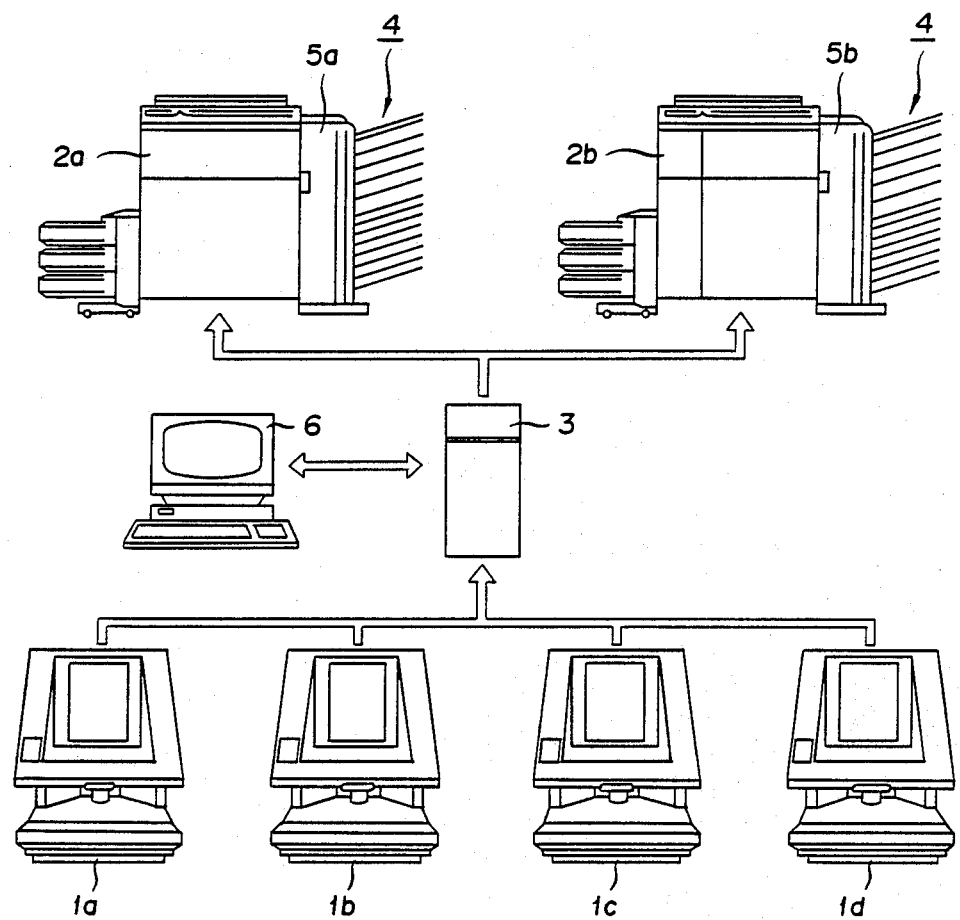
FIG. 2 is a schematic structural diagram of the system mentioned above.

As illustrated in Schema in FIG. 2, the image processing system of the present embodiment is composed of four scanners 1a to 1d, two LBP's 2a and 2b, and one control means (hereinafter referred to as "controller") connected to the scanners 1a to 1d and the LBP's 2a and 2b and adapted to establish selective connection between the scanners 1a to 1d and the LBP's 2a and 2b.

The scanners 1a to 1d serve the purpose of transforming microfilm images into electric signals (image data) through the medium of an imaging device such as CCD. The LBP's 2a and 2b modulate laser beams in accordance with the incident image data, forming latent images conforming to the image data on a sensitive material, developing latent images to obtain visual images, and transferring the developed images to a recording paper from the sensitive material.

To the LBP's 2a and 2b, connected respectively thereto are discharge paper bin sorters 5a and 5b which sort recording papers used and released from the LBP's 2a and 2b based on a command issued by a controller 3 and accordingly distribute them to a plurality of discharge paper bins 4. Now, the sorting operation normally carried out by the discharge bin sorters 5a and 5b will be described below as applied, for example, to an operation for producing 10 sets of recorded image data, each from five pages of image data. Two methods are available for this operation; in one method, the operation is to performed as to produce 10 sets each of five pages of recording paper by the use of 10 discharge paper bins 4 and, in the other method called grouping, the operation is accomplished by apportion as many pages of recording paper to give discharge paper bins.

To the controller 3 is connected an external computer 6 which externally issues various commands to the system. The present embodiment has been described as one having four scanners and two LBP's connected to one controller. The relative quantities mentioned are not critical. It suffices for this invention to have a plurality of scanners and a smaller number of LBP's than the scanners connected to one controller.

Figure 3:
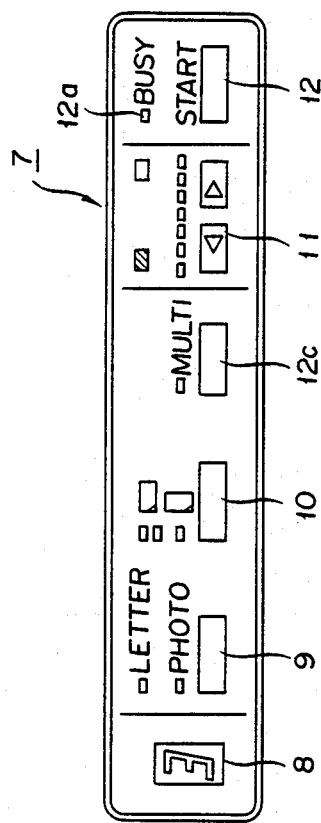
FIG. 3 is a diagram illustrating a control panel of the scanner.

FIG. 3 illustrates a control panel 7 which is provided for each of the scanners 1a to 1d. Now, the control panel 7 which is disposed on the scanner 1a will be described below as a representative of all the control panels used herein.

As illustrated in the diagram, on the control panel 7 disposed on the scanner 1a, there are laid out an indicator 8 for displaying the number of bins to which the recording papers formed with images based upon outputs of the image data from the scanner 1a are to be discharged, an image mode selection switch 9 for selecting a particular mode of images to be read out, a scan size selection switch 10 for selecting a particular size of images to be read out, an exposure level selection switch 11 for selecting a particular exposure level of images to be read out, a start switch 12 for commanding the actuation of the scanner, a busy LED 12a which is to be illuminated during the scanning movement and also when the transfer of the image data from each of the scanners 1a to 1d to the controller 3 is impossible, and a multi-selection switch 12c serving to make a selection between effecting and not effecting the multi-reading which will be fully described later on.

Figure 1:
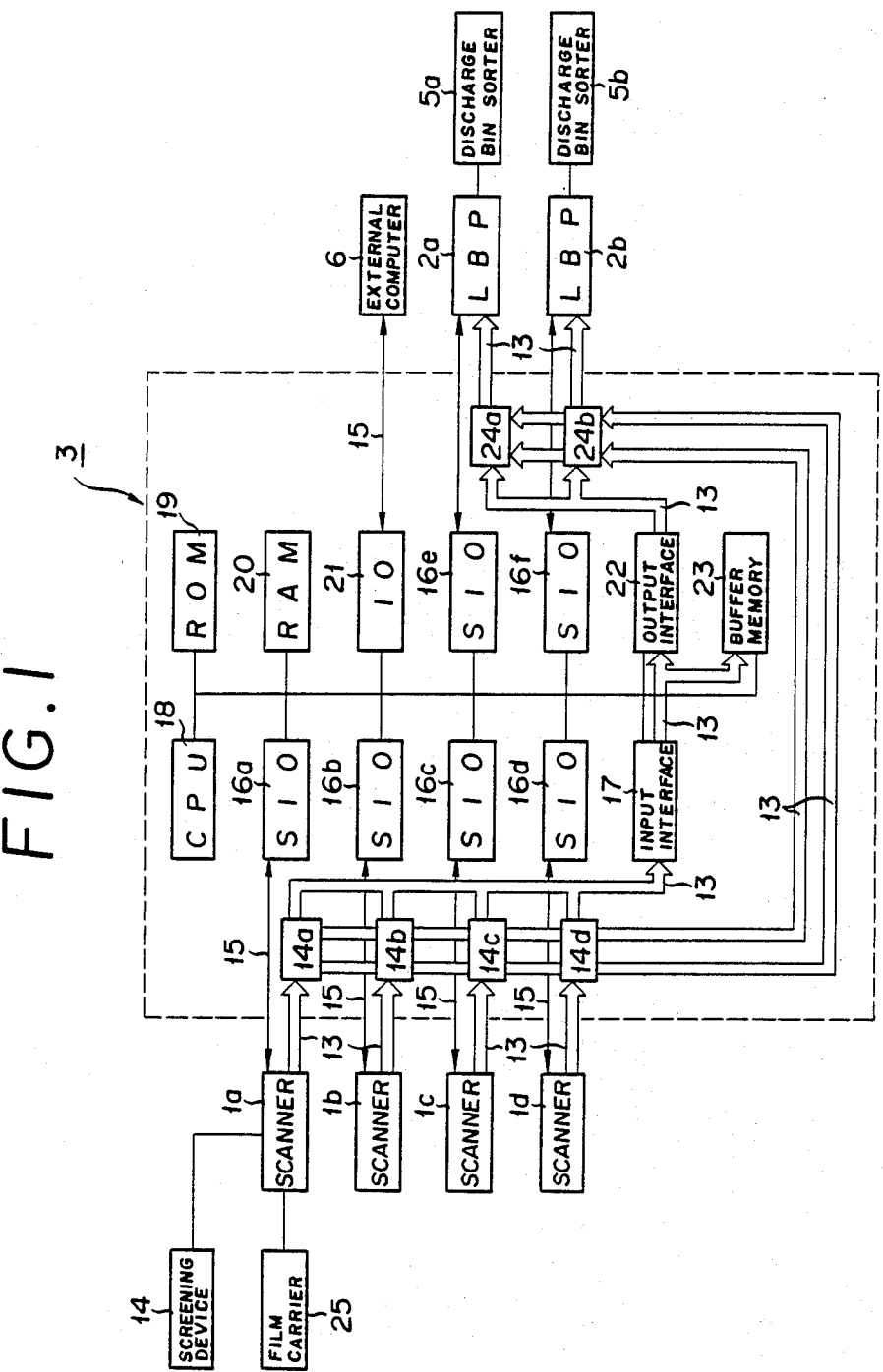
FIG. 1 is a schematic structural diagram illustrating the control part and its peripheral devices in a typical image processing system as one embodiment of this invention.

Now, the general construction of the control part and its peripheral devices in the image processing system of the present invention will be described below with reference to FIG. 1.

As illustrated in the diagram, to each of the scanners 1a to 1d provided one each with the control panels 7 mentioned above are connected a film carrier 25 capable of scanning various forms of microfilms and a retrieving device 14 for controlling the motion of the film carrier 25. To the scanners 1a to 1d, connected respectively thereto are input image bus switching parts 14a to 14d for switching image data via an image bus for transferring of image data. Also connected respectively thereto are serial input/output ports 16a to 16d via a control bus 15 for transferring control signals and others necessary for the exchange of image data. To these serial input/output ports 16a to 16d, connected severally thereto are an input interface 17 for feeding iamge data, a CPU 18 for issuing various commands based on the input data, an ROM 19 for storing various programs, a RAM 20 for temporarily storing various data, an input/output port 21 having the external computer 6 connected thereto through the medium of the control bus 15, serial input/output ports 16e and 16f connected respectively to the LBP's 2a and 2b likewise through the medium of the control bus 15, an output interface 22 for feeding out image data, and a buffer memory 23 for temporarily storing one screen full of image data.

To the input image bus switching parts 14a to 14d, output image bus switching parts 24a and 24b are connected through the medium of two image buses 13, and at the same time, an input interface 17 is connected likewise through the medium of the image buses 13. Here, the two image buses 13 are necessary because two LBP's 2 are connected to the controller 3. The number of image buses need not be limited to 2 but may be increased or decreased so as to equal the number of LBP's 2 to be used actually. To the imput interface 17, the output interface 22 and the buffer memory 23 are mutually connected through the medium of the image buses 13. The output interface 17 is connected to the output image bus switching parts 24a and 24b through the medium of the image buses 13. Then, to the output image bus switching parts 24a and 24b, the LBP's 2a and 2b having the dischrge bin sorters 5a and 5b connected respectively thereto are respectively connected.

Figure 4:
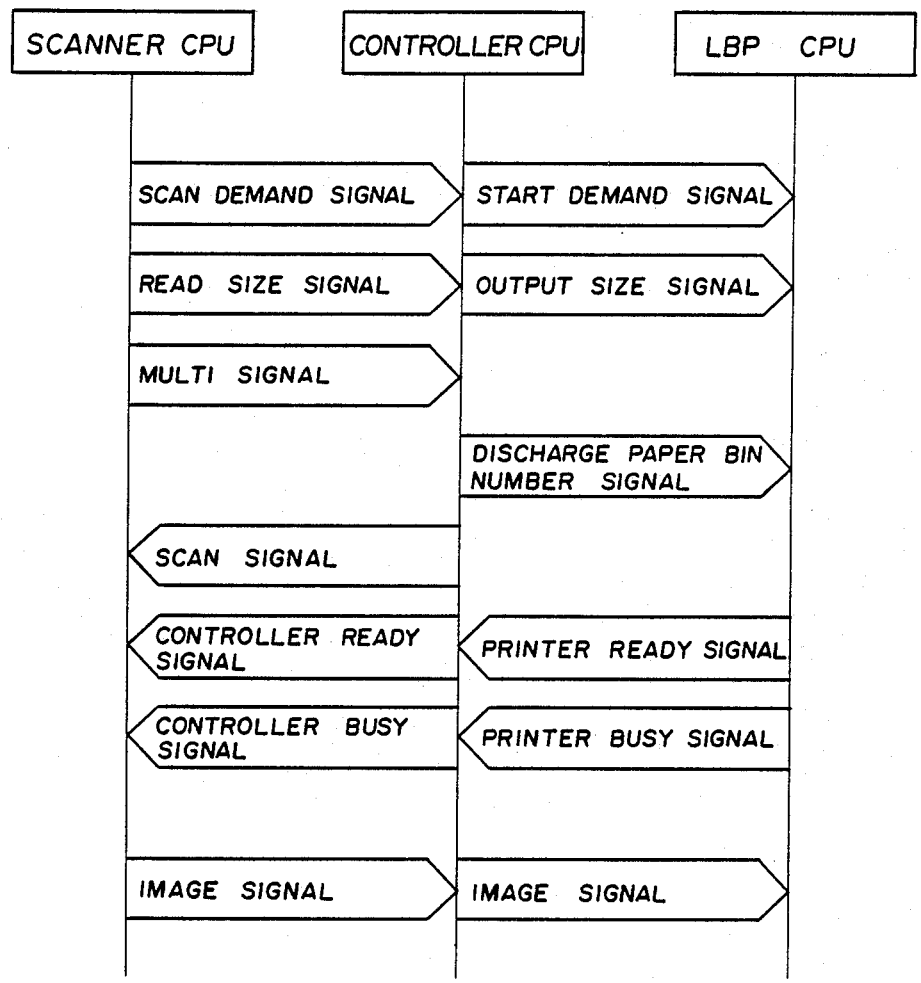
FIG. 4 is a diagram illustrating the traffic of signals within the system mentioned above.

Now, the operation of the image processing system constructed as described above will be explained below with reference to the diagram of FIG. 4 illustrating the traffic of signals within the image processing system and to the flowcharts of operation shown in FIGS. 5 to 8.

Figure 5A:
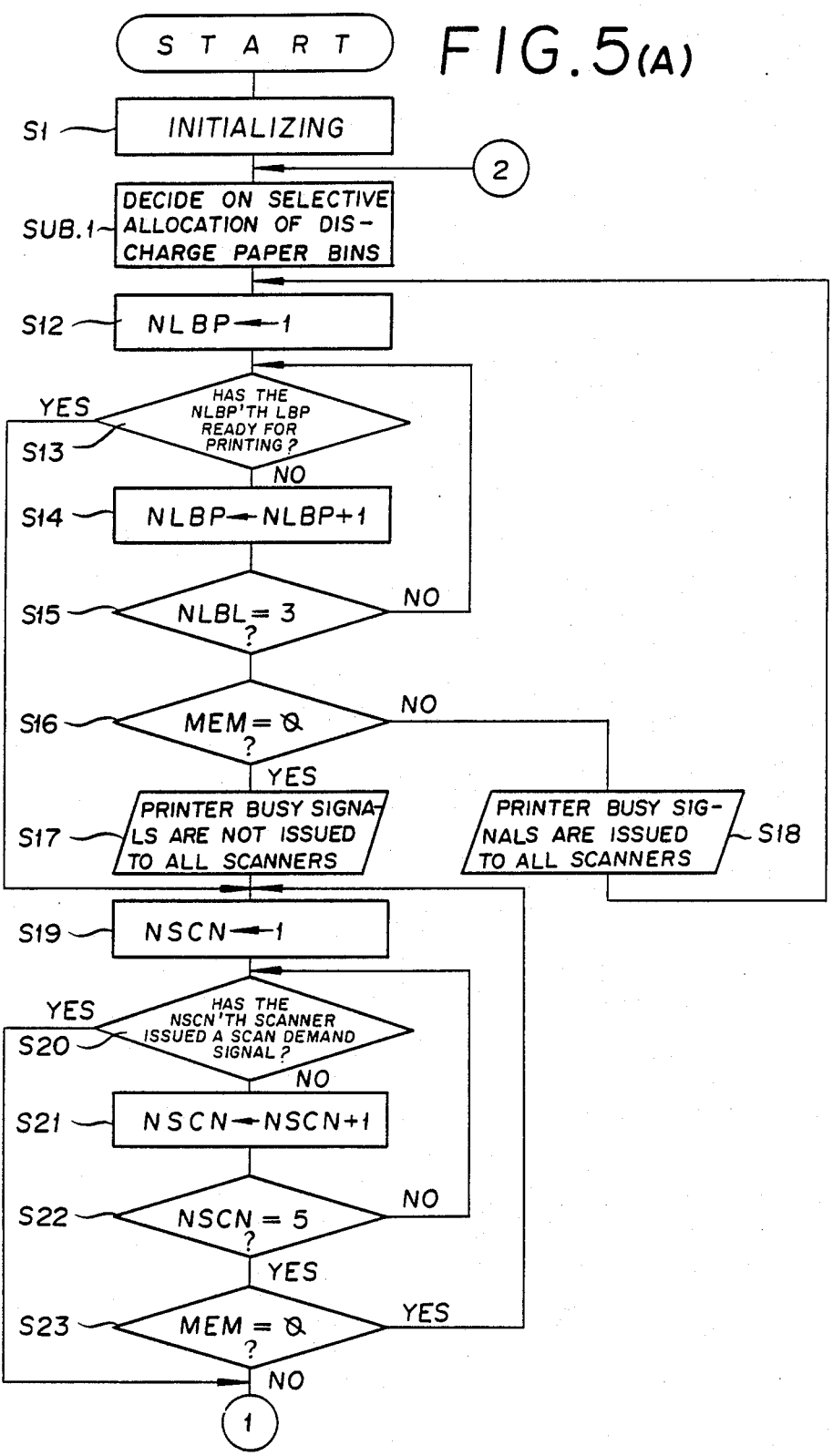
FIGS. 5 (A and B) FIG. 6 (A to E) FIG. 7 (A and B) and FIG. 7 (A and B and FIG. 8 are flowcharts depicting the operations of the system mentioned above.
Figure 5:
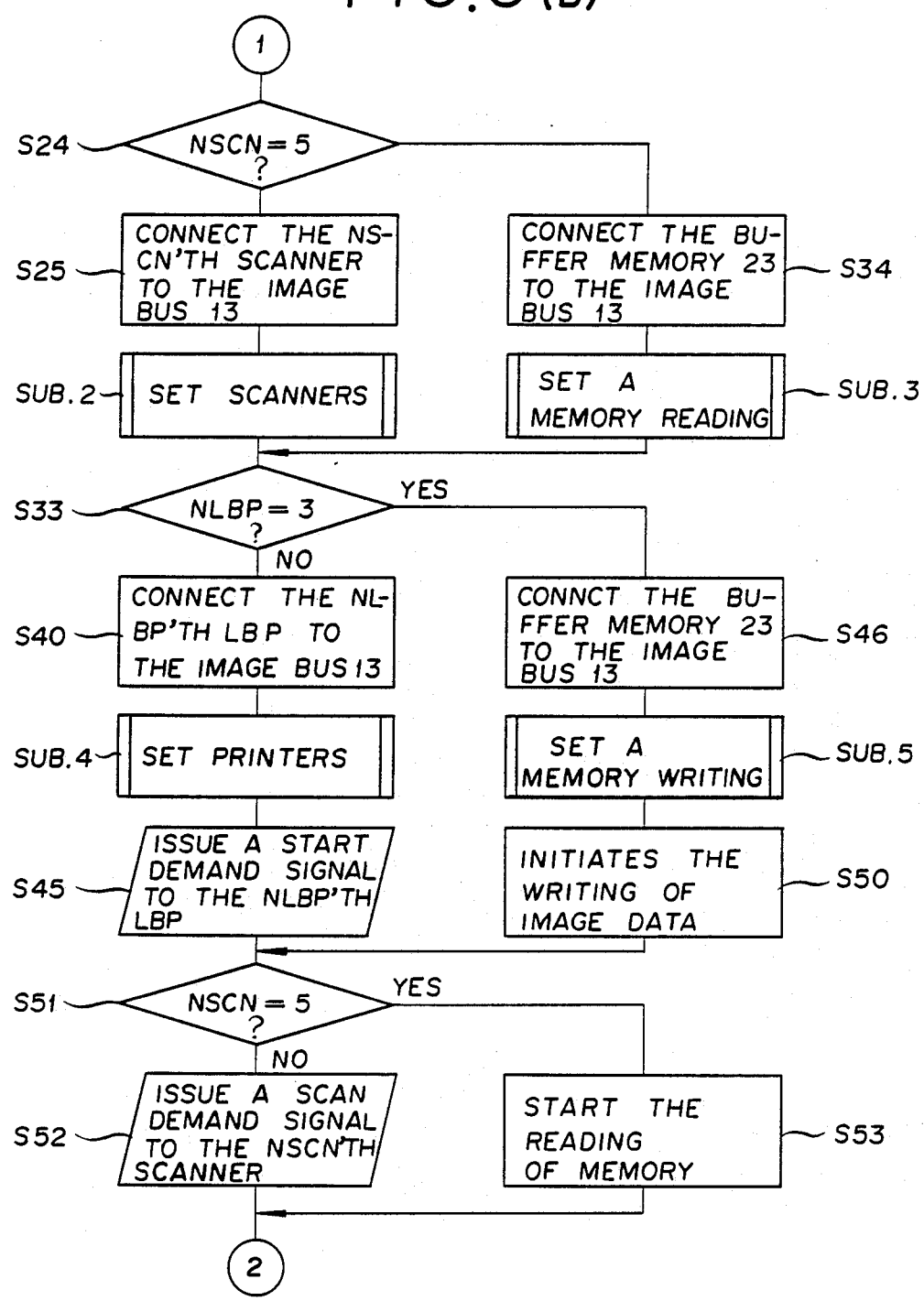
Figure 6A:
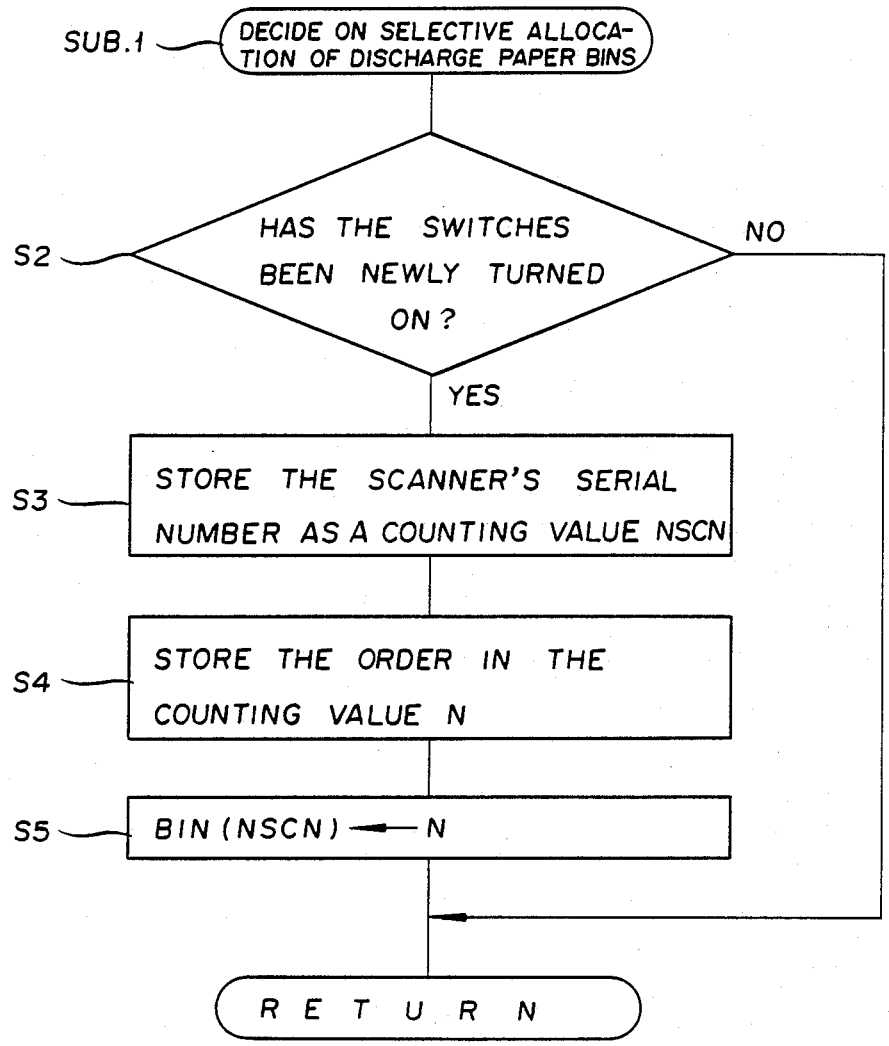
Figure 6B:
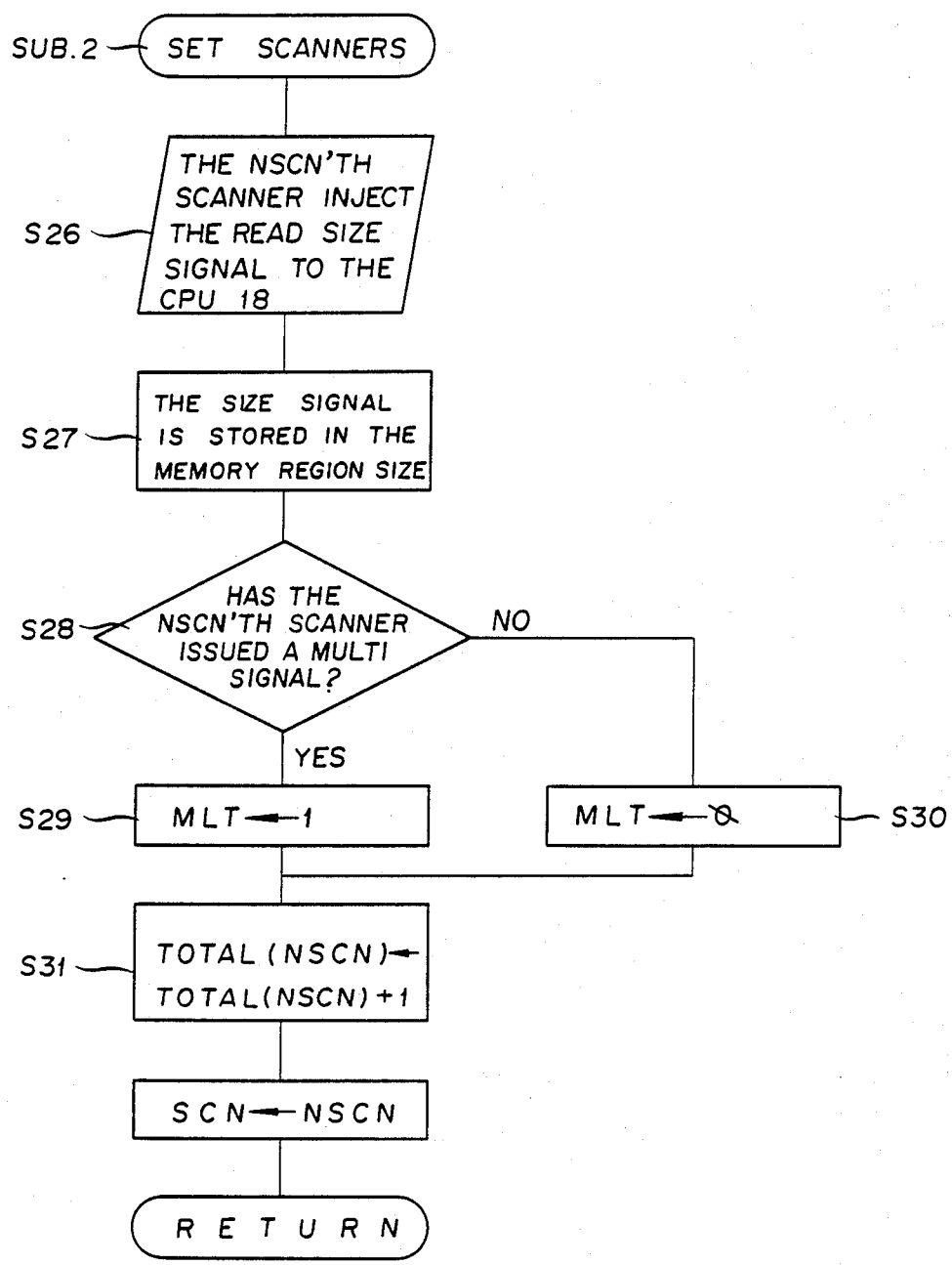
Figure 6C:
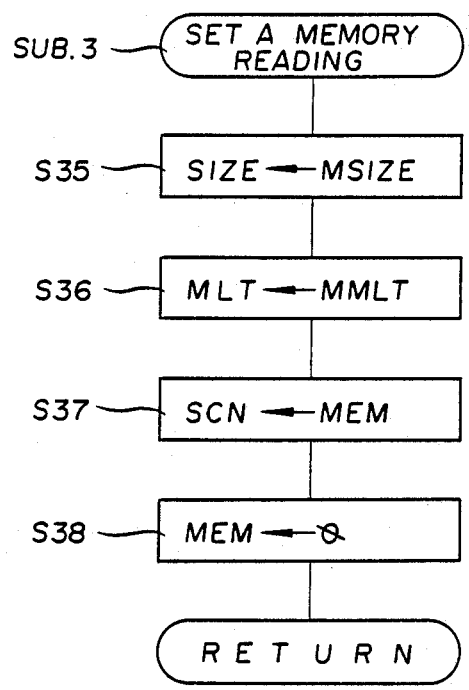
Figure 6D:
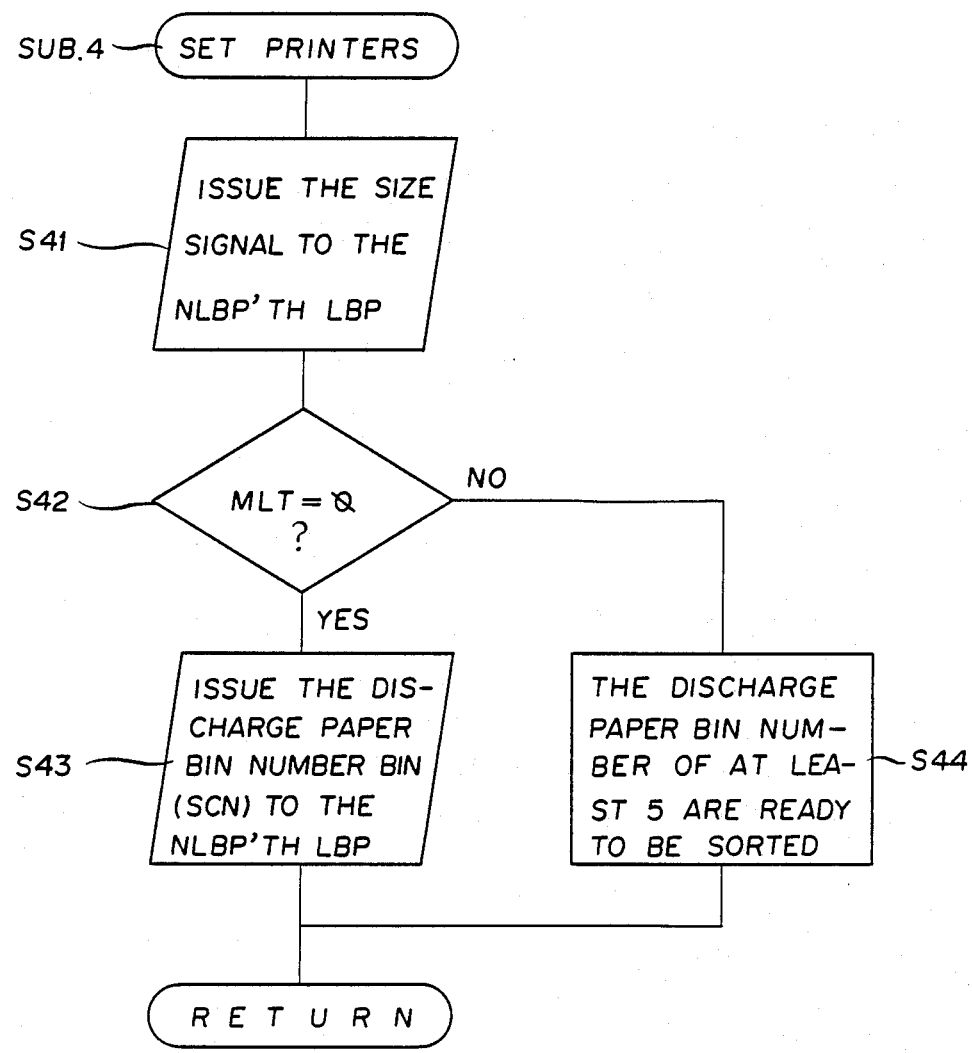

First, the description will be given with emphasis focussed on the flowchart of main routine in the controllers 3 shown in FIG. 5.

In the following description, the bins for each of the sorters 5a and 5b are assumed to be serially numbered as first bin, second bin, and so on in the descending order from the bin on the uppermost level. It is further assumed that the scanners 1a to 1d are serially numbered as first scanner, second scanner, and so on.

As the first step, initializing for starting the image processing system will be effected { Step 1 (hereinafter referred as"S1")}. When the preparation for starting the image processing system is completed in S1, a subroutine program for deciding on selective allocation of discharge paper bins 4 to the scanners 1a to 1d is executed { Subroutine 1 (hereinafter referred to as "SUB.1")}.

Now, the subroutine program for the selection of discharge paper bins will be described below with reference to the operational flowchart shown in FIG. 6 (A).

The CPU 18 first examines the power source switches (not shown) for the scanners 1a to 1d to determine whether or not any of the switches has been newly turned on (S2). When the absence of a newly turned switch is confirmed, the process is returned to S12 of the main flowchart. When the presence of a newly turned switch is confirmed, the serial number assigned to the scanner for which the corresponding power source switch has been newly turned on is stored in the form of a counting value NSCN in the first register serving to display the scanner number used for the sake of control (S3). At the same time that S3 is executed, the CPU 18 causes the order, in which the aforementioned power source switches have been turned on, to be stored in the counting value N of the second register serving to display the order in which the power source switches have been turned on (S4).

On completion of S3 and S4, the CPU 18 proceeds to carry out a control for setting one to one the counting value N of the second register as the counting value BIN(NSCN) which serves to display the discharge paper bin assigned to the particular one of the scanners 1a to 1d that said particular one bears NSCN as the scanner number (S5). In S2 to S5, the discharge paper bin numbers to be corresponded to the scanners are determined one to one without skipping between the discharge paper bins based on the order in which the power source switches of the scanners are turned on. Namely, in the present embodiment has been described, the discharge paper bins are allocated to the scanners based upon the order in which the power source switches of the scanners are turned on. Alternately, the discharge paper bins may be allocated to the scanners based upon the order in which the scanners are actuated.

In SUB. 1, each discharge paper bin is respectively allocated to scanner, and during the determination of discharge paper bins corresponding to scanners, no skipping is allowed to occur between the discharge paper bins. Since this measure precludes confusion of recording papers already used for copying and, at the same time, facilitates collection of the recording papers from the individual discharge paper bins, the efficiency of the operator's work is notably.

After the determination of the discharge paper bin numbers corresponding to the scanners 1a to 1d is completed in SUB. 1, the CPU 18 sets 1 as the counting value NLBP in the fourth register which serves to display the LBP number for the sake of control in S 12. At this point in the present embodiment, since two LBP's are connected to the scanners, the numbers 1 and 2 of the LBP numbers NLBP are used for designating the LBP's (2a and 2b) and the number 3 thereof for designating the buffer memory 23.

Then, the CPU 18 examines the LBP bearing the serial number of NLBP corresponding to the counting value displayed in the fourth register to decide whether or not the LBP has already issued a printer ready signal indicating that the LBP is ready for the printing (S 13). The processing advances to S 19 when the decision in S 13 has drawn an affirmative answer. The CPU 18 adds 1 to the counting value NLBP displayed in the fourth register when the decision has drawn a negative anser (s14). After the processing in s 14 is comleted, the CPU 18 proceeds to decide whether or not the counting value NLBP has reached the counting number 3 designating the buffer memory 23 (S 15). When the decision in S 15 has established that the counting value NLBP is now equal to the counting value 3 designating the buffer memory 23, namely that some of the LBP's still await decision as to whether or not a printer ready signal has been issued, the processing is returned to S 13.

When the decision in S 15 establishes that the printer ready signals for all the LBP's have not been issued, the CPU 18 proceeds to examine the buffer memory 23 and decide whether or not the buffer memory has a space available for further writing (S 16). When the presence of a space for memory in the buffer memory 23 is confirmed, the printer busy signals are not issued to all the scanners 1a to 1d (S 17). When the absence of a space for memory in the buffer memory 23 is confirmed, the printer busy signals are issued to all the scanners 1a to 1d (S 18). Then, the processing is returned to S 12. The buffer memory 23 has a capacity for image data which is covered by one round of scanning.

The processing, thus, is allowed to advnace to the next step, S 19, only when the decision made by CPU 18 in S 12 through S 18 establishes that the LBP's 2a and 2b have already issued printer ready signals or, in spite of the absence of such signal, the buffer memory 23 still has a space for storing image data.

Then, the CPU 18 sets 1 as the counting value NSCN in the first register which serves to display the scanner number for the sake of control (S 19). At this point, in the present embodiment, since four scanners are connected to the CPU 18, the numbers 1 to 4 in the scanner numbers NSCN are used for designating the scanners and the number 5 thereof for designating the buffer memory 23. The CPU 18 examines the scanner bearing the serial number of NSCN corresponding to the counting value to decide whether or not the scanner has issued a scan demand signal (S 20). The processing advances to S 24 when the decision in S 20 establishes that the scan demand signal has been issued. The CPU 18 adds 1 to the counting value NSCN when the decision establishes that the scan demand signal has not been issued (S 21).

When the processing in S 21 is completed, the CPU 18 examines the counting value NSCN and decides whether or not the counting value NSCN has reached the counting values 5 designating the buffer memroy 23 (S 22). The processing advances to S 23 when the decision in S 22 establishes that the counting value NSCN is now equal to the counting value 5 designating the buffer memory, namely that the scan demand signals for all the scanners have not been issued. The processing returns to S 20 when the decision establishes that the counting value NSCN is not equal to the counting value 5 designating the buffer memory 23, namely that some of the scanner still await decision whether or not the scan demand signals have been issued.

When the decision in S 22 confirms that no scan demand signal has been issued for any of the scanners the CPU 18 examines the buffer memory 23 to decide whether or not it has a space for further writing, namely whether or not the buffer memory 23 has any image data stored therein (S 23). When the CPU 18, in the decision in S 23, confirms that no image data is stored in the buffer memory, the processing is returned to S 19. When this decision confirms the presence of image data in the buffer memory 23 or when the decision in CPU 18 establishes that the scan demand signals for the scanners have been issued, the CPU 18 proceeds to examine the first register a second time to decide whether or not the counting value NSCN in the first register has reached the counting value designating the buffer memory 23 (S 24). In short, the decision to be made in S 24 is intended to determine whether the demand for scanning is based on the scan demand signal or on the image data stored in the buffer memory 23.

When the CPU 18 in the decision in S 24 establishes that the counting value NSCN is not equal to the counting value designating the buffer memory 23, namely that the demand for scanning is made by the scan demand signal from the scanner, the CPU 18 switches the input image bus switching parts 14a to 14d so as to establish connection between the scanner bearing the serial number NSCN designating the scanner issuing the scan demand signal and the image bus 13 (S 25). After the processing in S 25 is completed, the CPU 18 proceeds to execute a subroutine program for setting scanners (SUB. 2).

Now, the operation of SUB. 2 for setting scanners will be described below with reference to FIG. 6 (B).

First, the read size signal indicating the size of recording papers which is set by the NSCN'th scanner currently issuing the scan demand signal is injected to the CPU 18 (S 26). This size signal is stored in a prescribed memory region SIZE of a RAM 20 (S 27). In the meantime, the CPU 18 examines the NSCN'th scanner and decides whether or not it has issued a multi signal (S 28). When the decision confirms that the scanner has issued the multi signal, the CPU 18 sets 1 as the counting value MLT in the fifth register which serves to indicate whether or not the scanner will effect multi-reading (S 29). When the decision denies the issuance of the multi signal, the CPU 18 proceeds to set 0 as the counting value MLT in the fifth register (S 30).

The term "multi-reading" as used herein refers to the reading operation which carries out a plurality of rounds of scanning continuously on one microfilm image to obtain as many pieces of output and the term "multi signal" to the type of signal which is issued to the CPU 18 of the controller 3 from the scanner CPU when the aforementioned multi-reading is carried out.

When the processing in S 29 and S 30 is completed, the CPU 18 proceeds to carry out the addition of 1 to the total number of rounds of scanning, TOTAL (NSCN), which the NSCN'th scanner has made so far and, at the same time, set NSCN as the scanner number SCN serving as the source for image reading at the time that the image data are produced by the LBP 2 (S 32). Then, the processing is returned to the main routine S 33.

When the CPU 18, in the decision to be made in S 24, establishes that the counting value NSCN is equal to the counting value designating the buffer memory, namely that the demand for scanning is made by the image data stored in the buffer memory 23, the CPU 18 proceeeds to connect the buffer memory 23 to the image bus 13 through the medium of the input interface 17 (S 34). After the processing in S 34 is completed, the CPU 18 executes a subroutine program for setting a memory reading (SUB. 3).

Now, the operation of SUB. 3 for setting a memory reading will be descrcibed below with reference to FIG. 6 (C).

First, the CPU 18 sets a signal MSIZE indicating the size of image stored in the buffer memory 23 as a signal SIZE indicating the size of recording paper to be released from the LBP 2a or 2b (S 35) and, at the same time, sets a signal MMLT indicating whether or not the image stored in the buffer memroy 23 has undergone multi-reading in the form of the counting value MLT which serves to indicate whether or not the scanner effects multi-reading (S 36). Then, the CPU 18 proceeds to set the number MEM of the scanner which has read the image data stored in the buffer memory 23, as the scanner number SCN serving as the source for image reading at the time that the image data are fed out to the LBP 2a or 2b (S 37). When this processing is completed, the CPU 18 proceeds to set 0 as the scanner number MEM as the source for reading the image stored in the buffer memory 23 (S 38). The processing is then returned to the main routine S 33.

After the operation of SUB. 2 or SUB. 3 is completed, the CPU 18 proceeds to examine the fourth register and decide whether or not the counting value NLBP is euqual to 3, namely whether or not the LBP has issued a printer ready signal (S 33). When the decision made in S 33 confirms that the LBP has issued the printer ready signal, the CPU 18 switches the output image switching parts 24a and 24b so as to establish connection between the NLBP'th LBP and the image bus 13 (S 40). After the processing in S 40 is completed, the CPU 18 carries out a subroutine program for setting a printer (SUB. 4).

Now, the operation of SUB. 4 for setting a printer will be described below with reference to FIG. 4 (D).

First, the CPU 18 issues to the NLBP'th LBP, namely the LBP which is ready for printing, the size signal indicating the size of the image (S 41). Then the CPU 18 proceeds to examine the fifth register to decide whether or not the counting value MLT thereof is 0, namely whether or not the scanner will carry out multi-reading, (S 42). When this decision confirms that the scanner will not carry out multi-reading, the CPU 18 issues to the NLBP'th LBP the discharge paper bin number BIN(SCN) allocated by the aforementioned operation of SUB. 1 to the scanner number SCN which serves as the source for image rading at the time that the image data are produced by the LBP (S 43). In contrast, when the decision confirms that the scanner will carry out multi-reading, the CPU 18 issues to the NLBP'th LBP the discharge paper bin number of at least 5 indicating that the recording papers already used for printing are ready to be sorted (S 44). After the processing in S 43 or S 44 is completed, the processing is returned to the main routine S 45. When the printer is selected and readied, the CPU 18 issues a start demand signal to the NLBP'th LBP (S 45).

Conversely when the decision to be made in S 33 confirms that the LBP has not issued any printer ready signal, the CPU 18 proceeds to switch the output image switching parts 24a and 24b and, at the same time, establish connection between the buffer memory 23 and the image bus 13 through the medium of the output interface 22 (S 46). After the processing in S 46 is completed, the CPU 18 carries out a subroutine program for setting memory writing (SUB. 5).

Now, the operation of SUB. 5 for setting memory writing will be described below with reference to FIG. 6 (E).

First, the CPU 18 sets a signal SIZE indicating the size of recording paper to be released by the LBP 2, as the signal MSIZE which serves to indicate the size of image to be stored in the buffer memory 23 (S 47) and, at the same time, sets a counting value MLT of the fifth register serving to indicate whether or not the scanner effects multi-reading, as the signal MMLT indicating whetehr or not the image stored in the buffer memory 23 is in a multi form (S 48). Then, the CPU 18 proceeds to set the scanner number NSCN for the sake of control which is the counting value in the first register, as the scanner number MEM which is the source for the reading of the image stored in the buffer memory 23 (S 49). After the operation just described is completed, the processing is returned to the main routine S 50. Then, the CPU 18 proceeds to initiate the writing of image data in the buffer memroy 23 (S 50).

After the processing in S 45 or S 50 is completed, the CPU 18 makes a decision whether the demand for scanning is made by the scan demand signal or by the image data from the buffer memory 23 (S 51). When the decision confirms that the demand for scanning is based on the scan demand signal, the CPU 18 issues a scan signal to the NSCN'th scanner which has issued the demand for scanning (S 52). Conversely when the decision confirms the demand for scanning is based on the image data from the buffer memory 23, the CPU 18 proceeds to start the reading of memory (S 53). When the processing in S 52 or S 53 is completed, the processing returns to SUB. 1 and effects the control all over again.

Figure 7A:
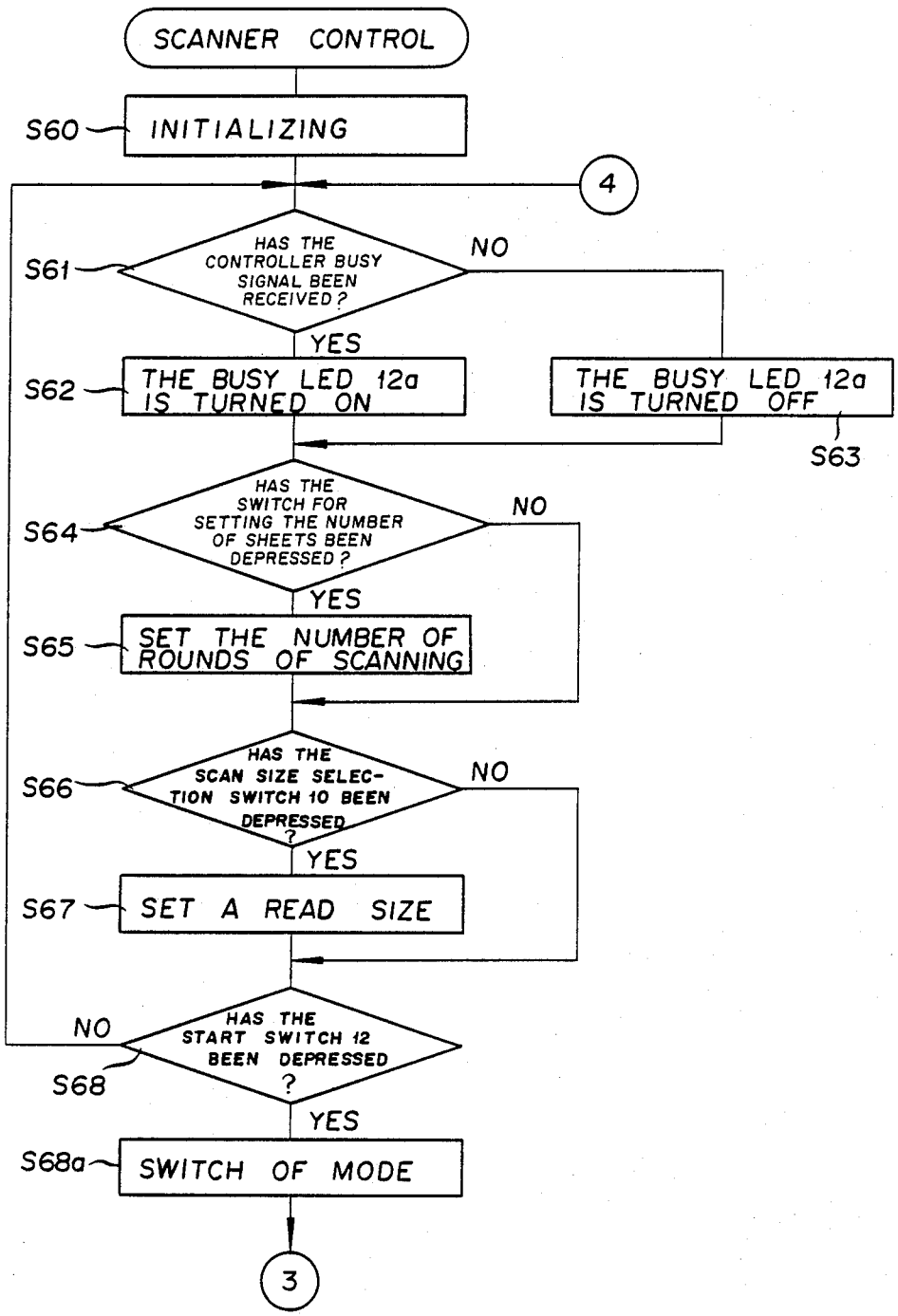
Figure 7B:
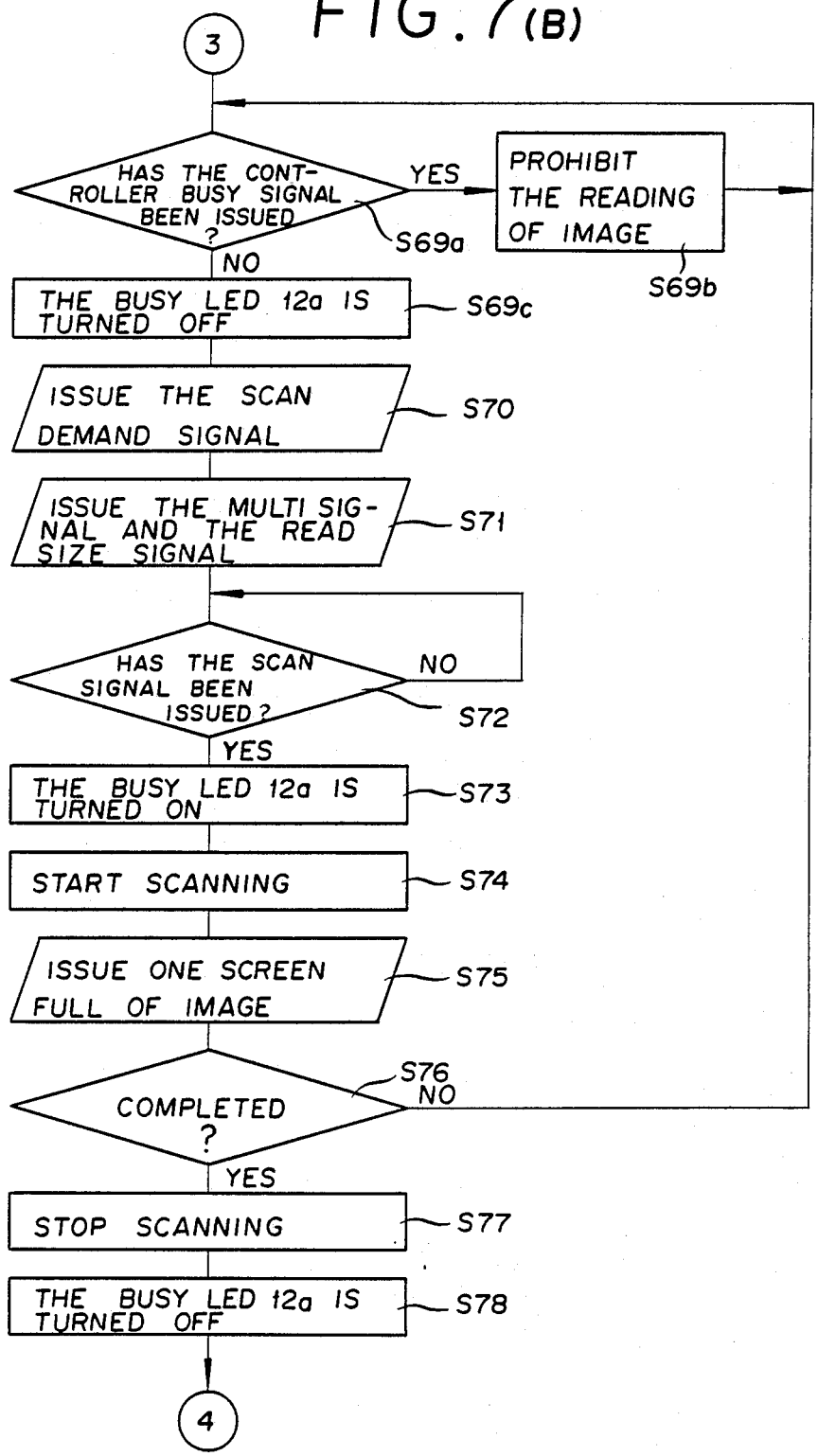

Then, the procedure of control performed by the microcomputer which controls the scanners will be described below with reference to the flowchart of operation shown in FIG. 7. Hereinafter, the microcomputer which controls the scanners will be referred to as "scanner CPU".

First, initializing of the scanner 1 is made (S 60) to have the scanner 1 readied for operation (S 60 ). When the preparation for starting the scanner 1 in S 60 is completed, the scanner CPU decides whether or not a controller busy signal inidicating that transfer of image date from the scanner to the controller 3 is prohibited has been received by the scanner (S 61). When the decision confirms that the controller busy signal has been received by the scanner, the busy LED 12a shown in FIG. 3 is turned on (S 62). Conversely when the decision establishes that the controller busy signal has not been received, the scanner CPU proceeds to turn off the busy LED 12a (S 63). In short, when the transfer of image data from the scanner to the controller 3 is prohibited, the busy LED 12a is set glowing by way of informing the operator of this fact. By this measure, the operator is enabled, when he cannot start the scanner by depressing the start switch 12, to find easily whether the failure of the scanner to respond to the depression of the start switch is due to mechanical trouble of the scanner or to the controller busy state. The term "controller busy state" as used herein refers to the state that the buffer memory 23 is devoid of a space available for further writing. The expression that "the LBP's 2a and 2b are busy" as used herein refers to the state in which the LBP's 2a and 2b have issued printer busy signals. To be specific, this state is assumed when the LBP's are in the process of producing an images or in the process of being repaired for removal of stuck paper.

After the processing in S 62 or S 63 is completed, the scanner CPU proceeds to decide whether or not a switch for setting the number of sheets has been depressed (S 64) and, on finding the switch in a depressed state, sets the number of rounds of scanning (S 65) or, otherwise, advances the processing to S 66. Further, the scanner CPU makes a decision whether or not the scan size selection switch 10 has been depressed (S 66) and, on finding this switch 10 in a depressed state, sets a read size (S 67) or, otherwise, advances the processing to S 68. Then, the scanner CPU decides whether or not the start switch 12 has been depressed (S 68) and, on finding the start switch 12 in a depressed state, proceeds to effects switch of mode (S 68a) and advances the processing to S 68a or, otherwise, advances the processing to S 61. The term "switch of mode" as used herein refers to an action to be carried out in the scanner for preparing this scanner for an actual scanner operation. To be specific, this action consists in moving a mirror for scanning to the position for starting the scanning operation or detecting the density of a microfilm image to be read, for example.

Then, the scanner CPU proceeds to decide again whether or not the controller busy signal has been issued (S 69a). When the decision confirms that the controller busy signal has been issued, the scanner CPU proceeds to prohibit the rading of image (S 69b) and, on completion of this action, returns the processing to S 69a. Conversely when the decision confirms that the controller busy signal has not been issued, the scanner CPU turns out the busy LED 12a by way of informing the operator that the transfer of image data from the scanner is ready to be started. At this time, the information as to the number of rounds of scanning and the size of reading formerly set in S 64 through S 67 is still kept in storage. When the microfilm is moved or some other switch on the control panel 7 is depressed while the action to prohibit reading initiated in S 69b is still in existence, the operator is allowed to release the start switch 12 from the depressed state. This measure precludes the otherwise possible unnecessary scanning of image data because the scanning is not initiated when some other data are detected while the prohibition of reading mentioned above is still in force. Optionally, the system may be configured so the various switches provided for the scanners may be kept from functioning while the prohibition of reading initiated in S 69b is still in process. Even when this modification is made, the preclusion of the unnecessary scanning of image data can be attained just the same because the microfilm is never allowed to move while the aforementioned prohibition of reading is still in existence.

To be specific in S 69a to S 69c, when the control busy state is detected, the scanner CPU prohibits the scanner from reading image and effects suspension of image reading and, upon reception of the controller ready signal, immediately discontinues the aforementioned suspension of image reading and, at the same time, turns off the busy LED 12a and informs the operator that the transfer of image data from the scanner is ready to be started. Since the operator is consequently relieved from the work of keeping watch on the operating condition of the LBP 2, the efficiency of the operator's work is notably improved.

When the processing in S 69c is completed, the scanner CPU issues the scan demand signal (S 70) and, at the same time, issues the multi-signal and the read size signal (S 71). Then, the scanner CPU proceeds to decide whether or not the scan signal has been issued (S 72). When this decision establishes that the scan signal has been issued, it turns on the busy LED 12a (S 73) and, at the same time, starts the scanning action (S 74) and effects the supply of one screen full of image signal to the controller 3 (S 75). Conversely, when the decision confirms that the scan signal has not been issued, the scanner CPU causes the decision of S 72 to be repeated until the scan signal is received.

Then, the scanner CPU proceeds to decide whether or not the action of reading (or the final scanning in the case of multi-reading) has been completed. When the decision confirms that the action has not yet been completed, the scanner CPU returns the processing to S 69a. Conversely when the decision confirms that the action has been completed, the scanner CPU stops the scanning action (S 77) and, at the same time, turns off the busy LED 12a (S 78) and, on completion of the processing of S 78, causes the preceeding processing to be repeated.

Figure 8:
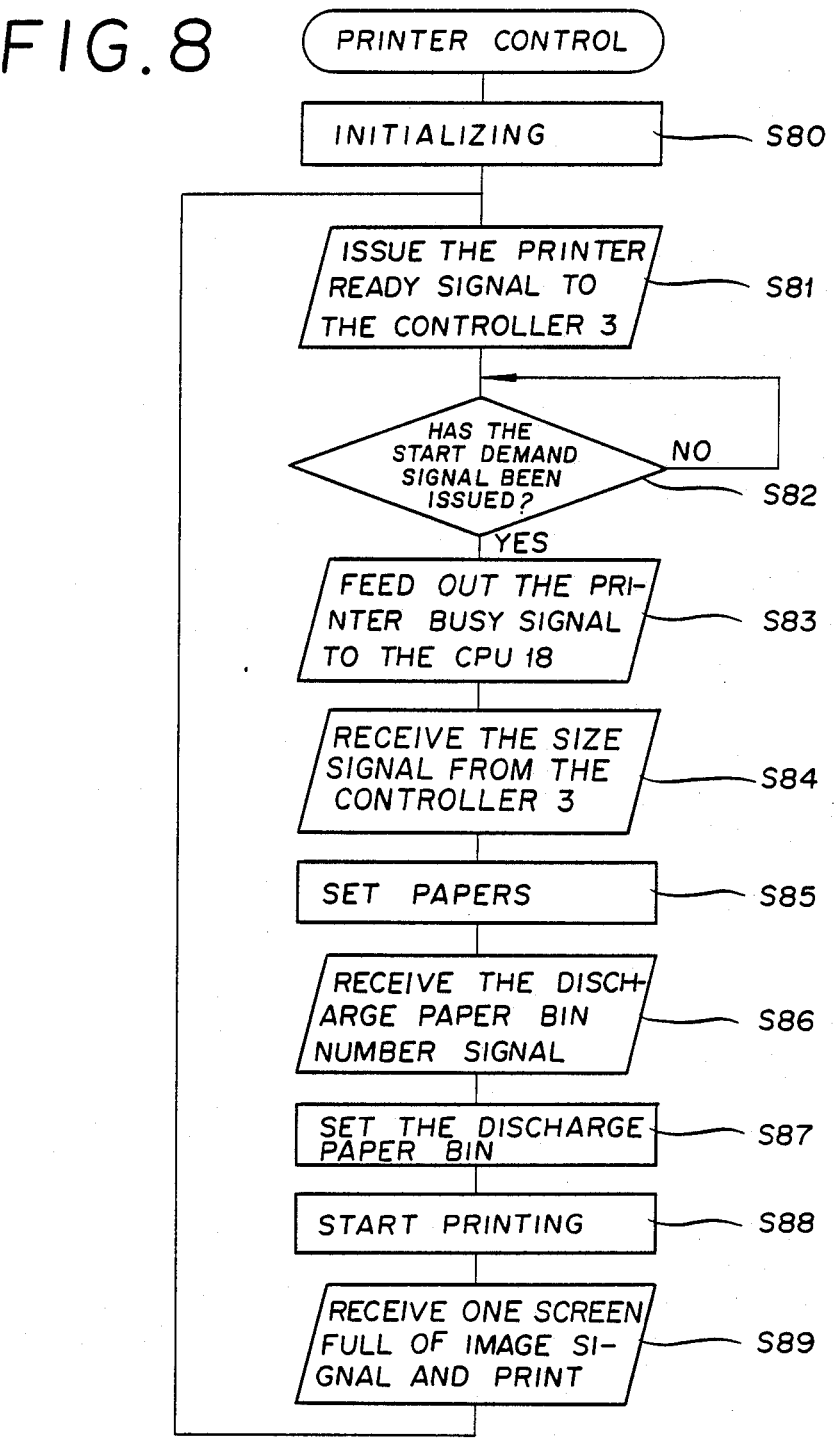

Now, the procedure of control of the microcomputer which controls the LBP's 2a and 2b will be described below with reference to the flowchart of operation shown in FIG. 8. This microcomputer will be referred to as LBP CPU hereinafter.

First, initial setting of LBP is effected so as to prepare the LBP for operation (S 80). When the preparation for starting the LBP's is completed in S 80, the LBP CPU issues the printer ready signal to the controller 3 by way of informing the operator that the print is ready to be started. Then, the LBP CPU decides whether or not the start demand signal has been issued (S 82) and, on confirming that the start demand signal has been issued, feeds out the printer busy signal to the CPU 18 (S 83) or, otherwise, causes the processing of S 82 to be repeated until the start demand signal is received.

When the processing in S 83 is completed, the LBP CPU receives from the controller 3 the size signal designating the size of recording paper (S 84) and, based on this size signal, causes the LBP to carry out the action of setting papers ready for use (S 85). The LBP CPU also receives from the controller 3 the discharge paper bin number signal designating the discharge paper bin number (S 86) and, based on the discharge paper bin number signal, carries out the action of setting the discharge paper bin (S 87). When the processing of S 87 is completed, the LBP CPU starts the printing action (S 88) and, on receiving one screen full of image signal from the controller 3, carries out the printing action in response to the image signal thus received (S 89).

In the present embodiment, the indicator 8 placed on the control panel 7 which is installed on each of the scanners 1a to 1d is adapted to indicate the particular discharge paper bin selected for discharging recording papers on which images have been printed based on the image date fed out by the corresponding scanner. Since the indicators 8 enable the operator to find the pertinent discharge paper bin at a glance, they serve the purpose of precluding the possibility of the operator taking recording papers from a wrong discharge paper bin.

Further in the present embodiment, the external computer 6 which is connected to the system through the medium of the control bus 15 and the input/output port 21 carries out the following operations. It parallelly controls the screening devices 14 connected severally to the scanners 1a to 1d as a host computer, synthesizes image singnals introduced through a given scanner 1 on the buffer memory 23, synthesizes image signals introduced through a given scanner 1 in comibnation with data introduced through the external computer 6 on the buffer memory 23, produces a plurality of hard copies with one scanning motion by storing image data in the buffer memory 23, effects partial erasure of image data by masking or trimming on the buffer memory 23, enlarges, reduces, or rotates an image on the buffer memory 23, moves an image on the buffer memory 23, and so on.

In the present embodiment, the system is so configurated that the indicators severally placed on the control panels fastened one each to the image readers will indicate discharge paper bin numbers corresponding to given image readers. The operator, therefore, is enabled to find a pertinent discharge paper bin at a glance and is prevented from making the mistake of removing recording papers from a wrong discharge paper bin.

The embodiment has been described as one using a microfim reader as an image reader. The use of the microfilm reader is not critical. Alternately the image processing system may be configruated by employing as an image reader a device capable of converting a visible image into electric signals.

Finally, though the present embodiment has been described as one using a laser beam printer as a printing means. The use of the laser beam printer is not critical. Alternately, the image processing system may be configruated by adopting as a printing means such a device as an ink jet printer or a thermal printer which is capable of converting an image signal into a visible image on a recording paper.

What is claimed is:

1. An image processing system comprising;
a plurality of image readers for electrically reading an image and producing corresponding image data;
printing means for producing an image on a recording medium based on said image data;
image data buses for selectively connecting said plurality of image readers and said printing means thereby permitting transfer of said image data produced from said image readers to said printing means;
image reader control means disposed severally on said image readers and adapted to control the motion of said image readers;
print control means disposed severally on said printing means and adapted to control the motion of said printing means;
data bus control means for controlling the state of connection of said image data buses;
said data bus control means being connected to said image reader control means and print control means;
command means disposed respectively on said image readers and adapted to command said image readers to start reading;
wherein said image reader control means start the motion of said image readers in response to the command to start reading issued from said command means and issue a read demand signal to said data bus control means, said data bus control means, on receiving said read demand signal, interconnect designated image readers and printing means with relevant data buses, and issue a start demand signal to said print control means, said print control means, on receiving said start demand signal, actuate said printing means and issue a printer busy signal to said data bus control means during the actuation of said printing means, said data bus control means issue a busy signal in response to said printer busy signal, and said image reader control means, said print control means, and said data bus control means discriminate the states of said image reader, said printing means and said data buses in accordance with said plurality of signals, and after receiving the command to start reading from said commnad means while said printing means are in operation, retain said command until the operation of said printing means is completed, and after completion of the operation of said printing means, set said imge reader operating.

2. An image processing system according to claim 1, wherein said printing means comprise a fewer printing apparatuses than said image readers.

3. An image processing system according to claim 1, which further comprises display means disposed severally on said image readers and adapted to inform the operator that said printing means are in operation.

4. An image processing system comprising:
a plurality of image readers for electrically reading an image and producing corresponding image data,
printing apparatus for forming an image on a sheet based on said image data;
means for effecting connection between said plurality of image readers and said printing apparatuses thereby permitting transfer of said image data produced by said image readers to said printing apparatuses;

command means disposed respectively on said image readers and adapted to issue a command for said image readers to start reading;

detection means for deciding whether or not said printing apparatuses are ready for use; and control means so adapted as to actuate said image readers when said command means issues a command and said detection means find said printing apparatuses in a state ready for use, and actuate said printing apparatuses in accordance with said image data from said image readers, or alternatively prohibit the motion of said image readers when said command means issues a command and said detection means find said printing apparatuses in a state not ready for use, actuate said image readers after said detection means find said printing apparatuses in a state ready for use, and actuate said printing apparatuses in accordance with said image data from said image readers.

5. An image processing system comprising:

a plurality of image readers for electrically reading an image and producing corresponding image data, said image readers adapted to make a preparation for reading, and on completion of said preparation, start reading;

printing means for producing an image on a recording medium in accordance with said image data;

means for establishing connection between said plurality of image readers and said printing means and thereby permitting transfer of said image data produced from said image readers to said printing means;

command means disposed respectively on said image readers and disposed to issue a command for said image readers to start reading;

means for deciding whether or not said printing means are in a state ready for use; and control means so adapted as to cause said image readers to prepare themselves and start reading when said command means issues a command and said printing means is found to be in a state ready for use, actuate said printing means in accordance with said image data from said image readers, cause said image readers to prepare themselves when said command means issue a command and said detection means find said printing means in a state not ready for use, subsequently prohibit the motion of said image readers until said detection means find said printing means in a state ready for use, allow said image readers to execute the action of reading after said detection means find said printing means in a state ready for use, and actuate said printing means in accordance with the data from said image readers.

* * * * *